United States Patent
Zabinski et al.

(10) Patent No.: US 10,054,057 B2
(45) Date of Patent: Aug. 21, 2018

(54) DOUBLE WALLED TUBE DRAINAGE SYSTEM

(71) Applicant: United Technologies Corporation, Farmington, CT (US)

(72) Inventors: Brittany Zabinski, Middletown, CT (US); Steven Dill, Glastonbury, CT (US); Matthew J. Howlett, North Haven, CT (US); Gregory S. Sheiferstein, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/316,794

(22) PCT Filed: Feb. 11, 2015

(86) PCT No.: PCT/US2015/015397
§ 371 (c)(1),
(2) Date: Dec. 6, 2016

(87) PCT Pub. No.: WO2015/195164
PCT Pub. Date: Dec. 23, 2015

(65) Prior Publication Data
US 2017/0198639 A1 Jul. 13, 2017

Related U.S. Application Data

(60) Provisional application No. 62/095,298, filed on Dec. 22, 2014, provisional application No. 62/013,755, filed on Jun. 18, 2014.

(51) Int. Cl.
*F02C 7/22* (2006.01)
*F02C 7/25* (2006.01)
(Continued)

(52) U.S. Cl.
CPC ............... *F02C 7/222* (2013.01); *F02C 7/25* (2013.01); *F16L 23/006* (2013.01);
(Continued)

(58) Field of Classification Search
CPC . F02C 7/222; F02C 7/25; F16L 23/006; F16L 39/005; F16L 55/07
See application file for complete search history.

(56) References Cited

U.S. PATENT DOCUMENTS 1,217,543 A * 2/1917 White ............... F16L 39/005
285/123.15
4,723,441 A 2/1988 Sweeney
(Continued)

FOREIGN PATENT DOCUMENTS

FR 2342454 A1 9/1977

OTHER PUBLICATIONS

International Preliminary Report on Patentability, for PCT Patent Application No. PCT/US2015015397, dated Dec. 20, 2016, 12 pages.
(Continued)

*Primary Examiner* — Craig Schneider
*Assistant Examiner* — Kevin Barss
(74) *Attorney, Agent, or Firm* — Kinney & Lange, P.A.

(57) ABSTRACT

A drainage assembly (68) includes a first segment (70A) with a first inner tube (76A) defining a first inner tube passage (78A), a first outer tube (72A) concentrically disposed around the first inner tube (76A) and defining a first outer tube passage (74A), and a first fitting (80A) disposed on an end of the first segment (70A). The first fitting (80A) has a first inner passage (82A) in fluid communication with the first inner tube passage (78A) and a first outer passage (84A) in fluid communication with the first outer tube passage (74A). A plate (88) is positioned adjacent the first
(Continued)

fitting (80A). The plate (88) has a second inner passage (90) in fluid communication with the first inner passage (82A) on one side, and a second outer passage (92) in fluid communication with the first outer passage (84A) on the one side. Also included is a drainage line (104) in fluid communication with the first outer tube passage (74A).

14 Claims, 4 Drawing Sheets

(51) Int. Cl.
*F16L 23/00* (2006.01)
*F16L 39/00* (2006.01)
*F16L 55/07* (2006.01)

(52) U.S. Cl.
CPC .............. *F16L 39/005* (2013.01); *F16L 55/07* (2013.01); *F05D 2220/32* (2013.01); *F05D 2260/6022* (2013.01)

(56) References Cited

U.S. PATENT DOCUMENTS

| | | | |
|---|---|---|---|
| 4,732,414 A * | 3/1988 | Inaba | F16L 39/005 |
| | | | 285/123.15 |
| 5,931,184 A | 8/1999 | Armenia et al. | |
| 8,820,794 B1 * | 9/2014 | Betz | F16L 33/2076 |
| | | | 285/123.15 |
| 2005/0120534 A1 | 6/2005 | Carns et al. | |
| 2008/0203669 A1 | 8/2008 | Schippl et al. | |
| 2011/0154856 A1 | 6/2011 | Andrian et al. | |
| 2013/0000747 A1 | 1/2013 | Buresi et al. | |

OTHER PUBLICATIONS

International Search Report & Written Opinion, for PCT Patent Application No. PCT/US2015/015397, dated May 21, 2015, 14 pages.

Extended European Search Report, for European Patent Application No. 15810126.1, dated May 24, 2017, 10 pages.

* cited by examiner

DOUBLE WALLED TUBE DRAINAGE SYSTEM

BACKGROUND

The present embodiments relate generally to tube assemblies, and more particularly to containing and draining fluid leakage from a tube assembly.

Common fluid conveyance assemblies utilize single walled tubes. However, when a leak develops in a single walled tube of such assemblies there is nothing to contain the leaking fluid, and thus nothing to prevent the leaking fluid from reaching a surrounding area. This is especially problematic, for instance, where the leaking fluid is flammable and the surrounding area is a fire zone. Consequently, common, single walled fluid conveyance assemblies have potential for introducing an uncontrolled fluid to a hazardous area. Therefore, in applications with particular safety requirements these common, single walled fluid conveyance assemblies may be undesirable.

SUMMARY

One embodiment includes a drainage assembly having a first segment with a first inner tube defining a first inner tube passage, a first outer tube concentrically disposed around the first inner tube and defining a first outer tube passage, and a first fitting disposed on an end of the first segment. The first fitting has a first inner passage in fluid communication with the first inner tube passage and a first outer passage in fluid communication with the first outer tube passage. The assembly also includes A second segment adjacent the first segment. The second segment has a second inner tube defining a second inner tube passage, a second outer tube concentrically disposed around the second inner tube and defining a second outer tube passage, and a second fitting disposed on an end of the second segment adjacent the first fitting. The second fitting has a second inner passage in fluid communication with the second inner tube passage and a second outer passage in fluid communication with the second outer tube passage. Additionally, a plate is configured between the first fitting and the second fitting. The plate has a third inner passage in fluid communication with the first inner passage on one side and the second inner passage on an opposite side. The plate also has a third outer passage in fluid communication with the first outer passage on one side and the second outer passage on an opposite side. Also included is a drainage line in fluid communication with the first outer tube passage or the second outer tube passage.

Another embodiment includes a method for draining a leak in an assembly. The method includes conveying a fluid flow through a first inner tube of a first segment with the first segment positioned in a first area. A fluid leakage from the first inner tube is trapped with a first outer tube of the first segment concentrically disposed around the first inner tube. The fluid leakage is conveyed through the first outer tube to a drainage line, and the fluid leakage is conveyed through the drainage line to a second area having environmental conditions differing from environmental conditions of the first area.

A further embodiment includes a drainage assembly having a first segment with a first inner tube defining a first inner tube passage, a first outer tube concentrically disposed around the first inner tube and defining a first outer tube passage, and a first fitting disposed on an end of the first segment. The first fitting has a first inner passage in fluid communication with the first inner tube passage and a first outer passage in fluid communication with the first outer tube passage. A plate is configured adjacent the first fitting. The plate has a second inner passage in fluid communication with the first inner passage on one side, and a second outer passage in fluid communication with the first outer passage on the one side. Also included is a drainage line in fluid communication with the first outer tube passage.

While the above-identified drawing figures set forth multiple embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present embodiments provide assemblies and methods for both containing a leaking fluid and routing the leaking fluid to an appropriate, safe area to drain. Concentric inner and outer tubes are utilized, with the inner tube serving to convey fluid in normal operation and the outer tube serving to both entrap any leaking fluid and drain the leaking fluid to a safe area.

Figure 1:
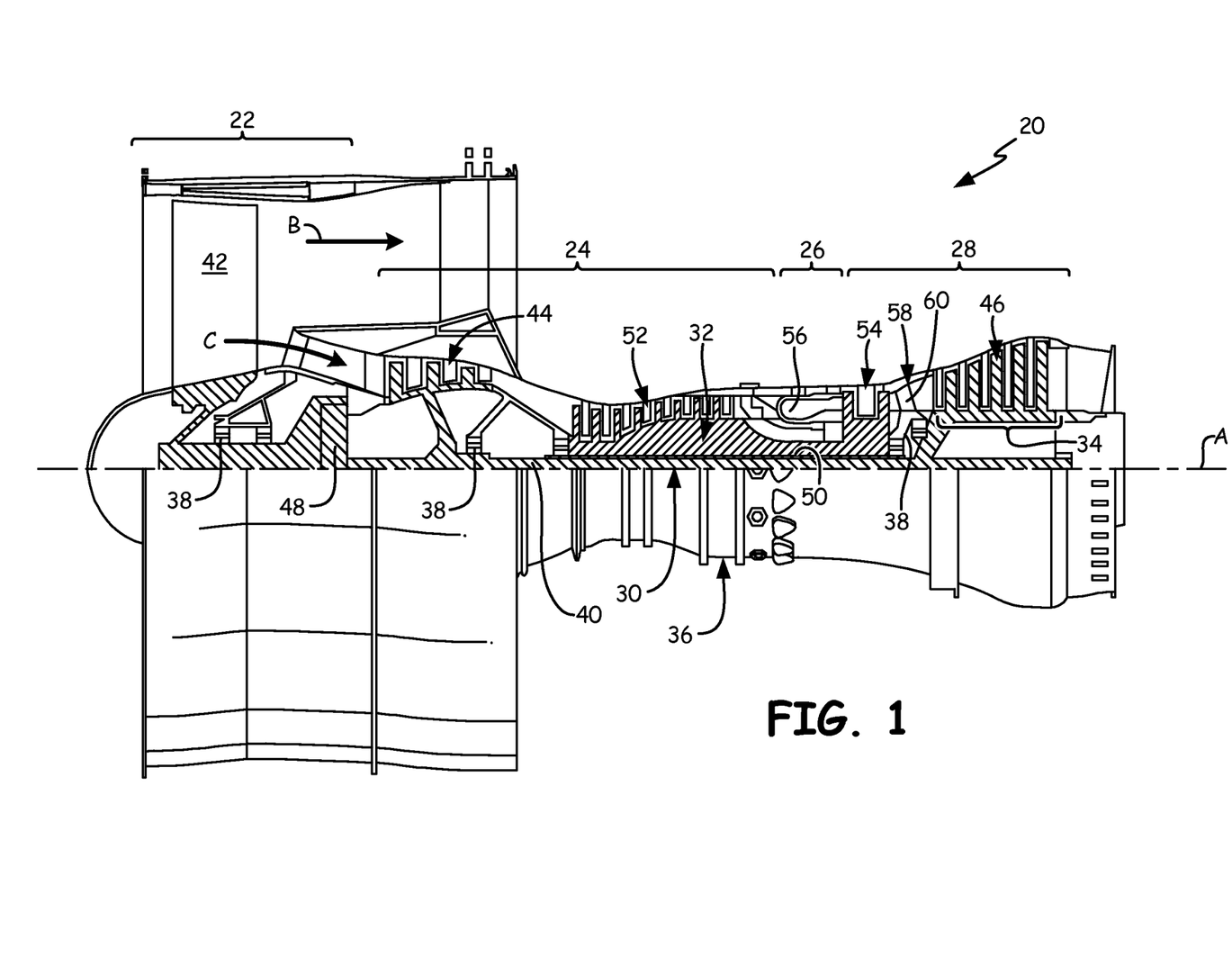
FIG. 1 is a schematic quarter sectional view of an embodiment of a gas turbine engine.

FIG. 1 is a quarter sectional view that schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use within turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

Example engine 20 generally includes low speed spool 30 and high speed spool 32 mounted for rotation about engine central longitudinal axis A relative to engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide double stage high pressure turbine 54. In another example, high pressure turbine 54 includes only a single stage. As used herein, a "high pressure" compressor or turbine experiences a higher pressure than a corresponding "low pressure" compressor or turbine.

Example low pressure turbine 46 includes turbine rotors schematically indicated at 34 and has a pressure ratio that is greater than about 5. The pressure ratio of example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 can be arranged generally between high pressure turbine 54 and low pressure turbine 46. Mid-turbine frame 58 can include vanes 60 and further supports bearing systems 38 in turbine section 28 as well as setting airflow entering low pressure turbine 46.

Core airflow C is compressed by low pressure compressor 44 then by high pressure compressor 52 and mixed with fuel and ignited in combustor 56 to produce high speed exhaust gases that are then expanded through high pressure turbine 54 and low pressure turbine 46.

The disclosed gas turbine engine 20 in one example is a high-bypass geared aircraft engine. In a further example, gas turbine engine 20 includes a bypass ratio greater than about six (6), with an example embodiment being greater than about ten (10). Example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines with or without geared architecture.

A significant amount of thrust is provided by bypass flow B due to the high bypass ratio. Fan section 22 of engine 20 is designed for a particular flight condition—typically cruise at about 0.8 Mach and about 35,000 feet (10,668 m). The flight condition of 0.8 Mach and 35,000 ft. (10,668 m), with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

Figure 2A:
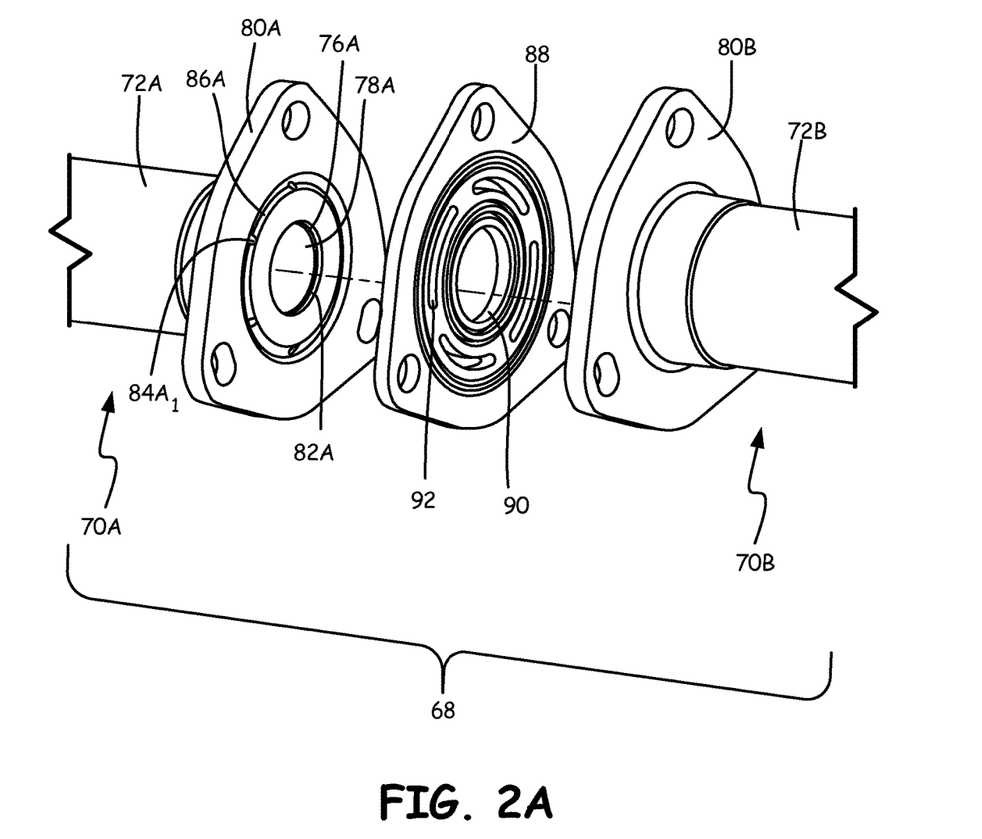
FIG. 2A is an exploded, perspective view of a portion of an embodiment of a drainage assembly according to the present invention.
Figure 2B:
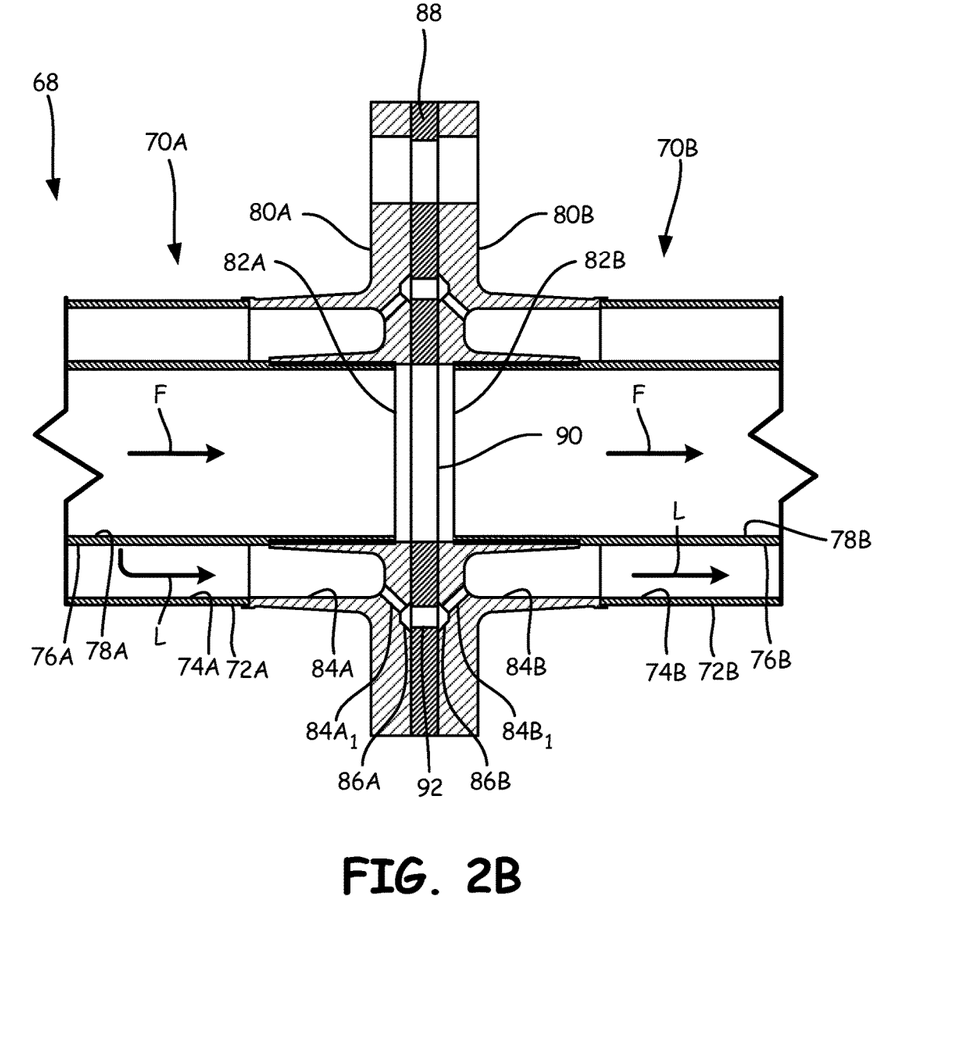
FIG. 2B is a cross-sectional view of the drainage assembly of FIG. 2A.

FIGS. 2A and 2B show a portion of an embodiment of drainage assembly 68. FIG. 2A illustrates an exploded, perspective view of drainage assembly 68, while FIG. 2B illustrates a cross-sectional view of drainage assembly 68. The section illustrated in FIG. 2B is taken along the projected line illustrating the order of assembly in the exploded view of FIG. 2A.

Drainage assembly 68 includes adjacent segments 70A and 70B. In the embodiment illustrated in FIGS. 2A and 2B, segments 70A and 70B have similar configurations. Segment 70A includes outer tube 72A which defines outer tube passage 74A. Outer tube 72A is concentrically disposed around inner tube 76A. Inner tube 76A defines inner tube passage 78A. In one embodiment, outer tube 72A and inner tube 76A can be a single integral and monolithic piece. Fitting 80A is located on an end of segment 70A, and can be made to be integral with segment 70A or in other embodiments fitting 80A can be welded, brazed, or otherwise attached to outer tube 72A and/or inner tube 76A. Fitting 80A has inner passage 82A in fluid communication with inner tube passage 78A and outer passages 84A in fluid communication with outer tube passage 74A. Additionally, outer passages 84A include branches $84A_1$, which can have a smaller cross-sectional area than outer passages 84A and can be arranged at a different angle than outer passages 84A. Any suitable number of branches $84A_1$ can be provided (e.g. seven), and branches $84A_1$ can be equally or unequally circumferentially spaced. Fitting 80A can include groove 86A on which at least a portion of branches $84A_1$ are circumferentially located. In the illustrated embodiment, groove 86A extends in a direction into fitting 80A and can serve as a location for an additional sealing mechanism.

Similar to that described with respect to segment 70A, segment 70B has outer tube 72B which defines outer tube passage 74B. Outer tube 72B is concentrically disposed around inner tube 76B. Inner tube 76B defines inner tube passage 78B. Fitting 80B, located on an end of segment 70B adjacent fitting 80A, includes inner passage 82B in fluid communication with inner tube passage 78B and outer passages 84B in fluid communication with outer tube passage 74B. Additionally, outer passages 84B include branches $84B_1$, which can have a smaller cross-sectional area than outer passages 84B and can be arranged at a different angle than outer passages 84B. Any suitable number of branches $84B_1$ can be provided, and branches $84B_1$ can be equally or unequally circumferentially spaced. Fitting 80B can include groove 86B, similar to groove 86A of fitting 80A, on which at least a portion of branches $84B_1$ are circumferentially located.

Assembly 68 also includes plate 88. Plate 88 is configured between fittings 80A and 80B, such that plate 88 interfaces with fitting 80A on one side and fitting 80B on an opposite side. Plate 88 can be secured to fittings 80A and 80B, for example, via pins, bolts, screws, or other coupling means. Plate 88 has inner passage 90 in fluid communication with inner passage 82A on one side and inner passage 82B on an opposite side. Plate 88 also includes outer passages 92 which are in fluid communication with outer passages 84A (via branches $84A_1$) on one side and outer passages 84B (via branches $84B_1$) on an opposite side.

In the embodiment illustrated in FIGS. 2A and 2B, outer passages 92 are arc-shaped slots spaced circumferentially around plate 88 on portions of plate 88 that align with branches $84A_1$ and $84B_1$ of outer passages 84A and 84B respectively. Additionally, as shown, one or more outer passages 92 can have a cross-sectional area greater than a cross-sectional area of one or more aligned branches $84A_1$ and $84B_1$, while a cross-sectional area of inner tube passages 78A and 78B, inner passages 82A and 82B, and inner passage 90 can be substantially the same. Moreover, a cross-sectional area of inner passages 82A, 82B, and 90 can be greater than the cross-sectional area of branches $84A_1$ and $84B_1$. Depending on the sizing of outer passages 92 and branches $84A_1$ and $84B_1$, one passage 92 can be in fluid communication with multiple branches $84A_1$ on one side and multiple branches $84B_1$ on an opposite side. As also shown in FIGS. 2A and 2B, a cross-sectional shape of inner passage 82A, inner passage 82B, and inner passage 90 can be substantially the same (e.g. circular, oval), while a cross-sectional shape of branches $84A_1$ and $84B_1$ can be the same (e.g. circular, oval) but differ from a cross-sectional shape of outer passages 92 (e.g. arc-shaped). Where such a configuration is present, at an interface of inner passage 82A, inner passage 90, and inner passage 82B fluid communication can occur at all locations radially inside of a perimeter of inner passage 82A, inner passage 82B, and inner passage 90 at the interface. However, at an interface of branch $84A_1$, outer passage 92, and branch $84B_1$ fluid communication can occur at less than all locations radially inside of a perimeter of outer passage 92. Over-sizing outer passage 92 relative to aligned branches $84A_1$ and $84B_1$ provides tolerance when aligning branches $84A_1$ and $84B_1$ with passage 92 during assembly.

In operation, fluid F is conveyed from segment 70A to segment 70B. Fluid F flows through inner tube passage 78A and enters inner passage 82A of fitting 80A. Fluid F is then communicated from inner passage 82A to inner passage 90 of plate 88, and on to inner passage 82B of fitting 80B. Fluid F then flows from inner passage 82B to inner tube passage 78B of segment 70B. Fluid F can then continue to be conveyed to a next segment adjacent segment 70B in a similar manner.

However, fluid leakage L can occur due to a crack or other porous feature developed in inner tube 76A (the description that follows would also apply to inner tube 76B). Consequently, not all of fluid F will be contained within inner tube 76A.

Therefore, outer tube 72A is used to entrap or contain fluid leakage L from inner tube 76A so that leakage L does not reach an area surrounding first segment 70A. In one application, segment 70A can be positioned in an area that is a fire zone, such as combustor section 26 of engine 20, and fluid F (and thus leakage L) can be a flammable fluid such as fuel. Consequently, the use of outer tube 72A to entrap fluid leakage L can enhance the safety of certain applications as leakage L is prevented from reaching the area surrounding segment 70A.

However, in many instances the volume of fluid F traveling through inner tube 76A can be significant, and therefore the amount of leakage L from inner tube 76A can collect within outer tube 72A over time. For this reason, assembly 68 is configured to allow leakage L to be conveyed from segment 70A to 70B, and additionally to any number of desired adjacent segments in a similar manner to allow leakage L to be drained from assembly 68 at a location that is more appropriate or simply more desirable.

Leakage entrapped within outer tube 72A flows along outer tube passage 74A to outer passage 84A. Leakage L then passes into branches $84A_1$ where leakage L is conveyed to outer passage 92. From outer passage 92 leakage L is conveyed to branches $84B_1$ where leakage L flows into outer passage 84B and then into outer tube passage 74B of segment 70B. In the illustrated embodiment, leakage L is conveyed in a direction generally radially outward from outer tube passage 74A through branches $84A_1$. Leakage L then reaches outer passage 92, and is further conveyed in a direction generally radially inward by branches $84B_1$ from outer passage 92 to outer tube passage 74B of segment 70B. Once leakage L is conveyed from segment 70A to segment 70B as described, in one embodiment leakage L can be drained from segment 70B to an area having environmental conditions differing from those present around or near segment 70A. In other embodiments where environmental conditions present around or near segment 70B are similar to those around or near segment 70A, leakage L can be conveyed through additional adjacent segments in a similar manner as that described until leakage L is conveyed to a segment located in an area having environmental conditions differing from those of segments 70A and 70B.

Figure 3:
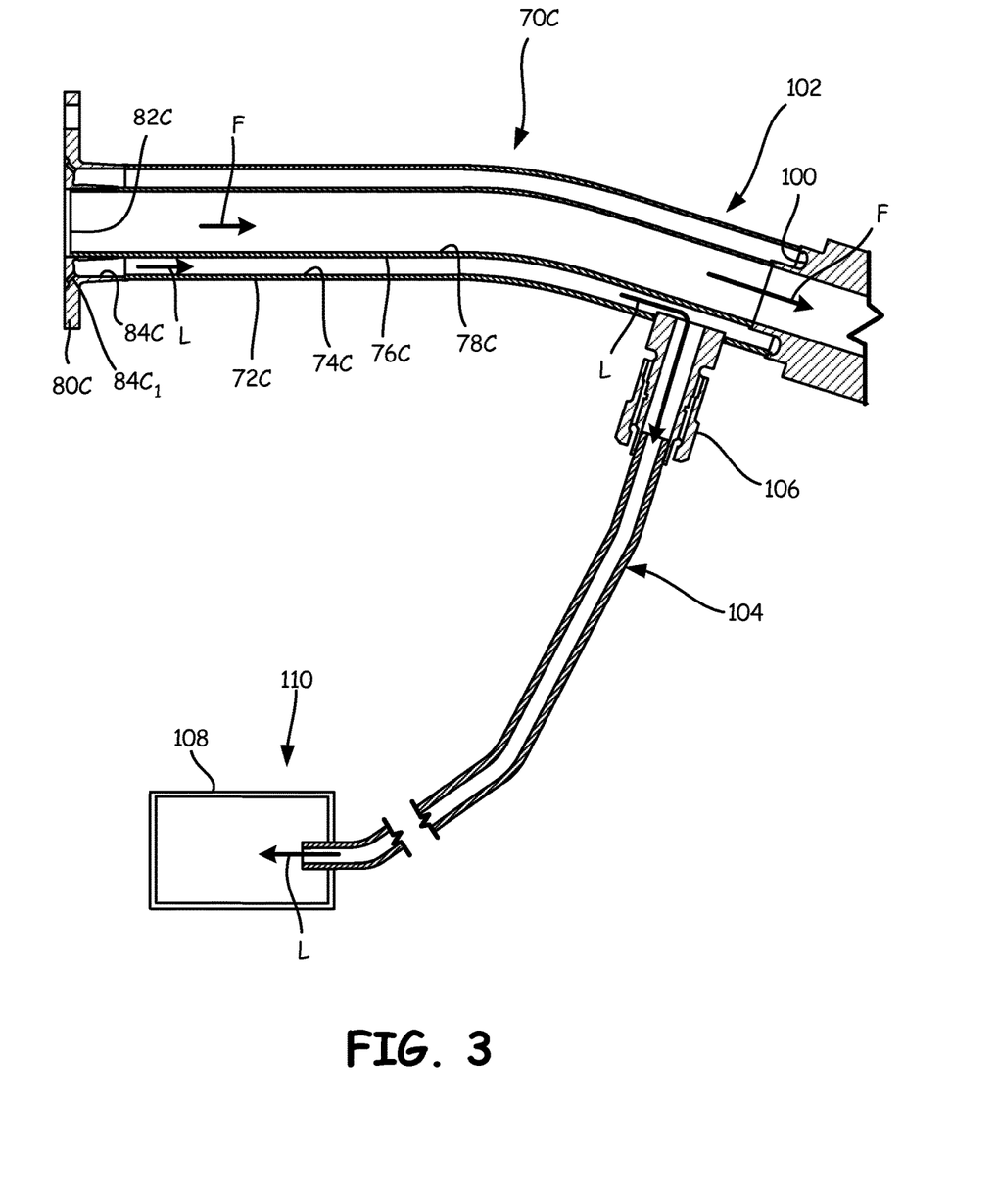
FIG. 3 is a cross-sectional view of a segment including a drainage line.

FIG. 3 illustrates a cross-sectional view of segment 70C. Segment 70C is configured similar to that described with respect to segments 70A and 70B, with outer tube 72C defining outer tube passage 74C, inner tube 76C defining inner tube passage 78C, fitting 80C having inner passage 82C, outer passage 84C, and branches $84C_1$. However, segment 70C does differ in some respects from segments 70A and 70B.

Segment 70C inner tube passage 78C is fluidly connected on both ends of segment 70C such that inner tube passage 78C receives fluid F from inner passage 82C and conveys fluid F through segment 70C to an end of segment 70C opposite inner passage 82C (and thus opposite fitting 80C) where fluid F is conveyed to an adjacent segment or other part. However, outer tube passage 74C can be in fluid communication on only one side of segment 70C. Outer tube passage 74C can receive leakage L from outer passage 84C and can have dead end fitting 100 on an end of outer tube passage 74C opposite outer passage 84C (and thus fitting 80C), such that leakage L cannot be further conveyed through outer tube passage 74C (i.e. past the end of outer tube passage 74C opposite outer passage 84C) to an adjacent segment or other part as fluid F can in inner tube passage 78C. This configuration of outer tube passage 74C allows leakage L to collect in outer tube passage 74C of segment 70C. In the illustrated embodiment, segment 70C includes bend 102 which utilizes gravity to further direct the collection of leakage L within dead end 100 of outer tube passage 74C.

In the embodiment illustrated in FIG. 3, segment 70C further includes drainage line 104. Drainage line 104 is in fluid communication with outer tube passage 74C on one end via coupling 106 and in fluid communication with reservoir 108 on an opposite end. In operation, leakage L collects at dead end fitting 100 of outer tube passage 74C and flows into coupling 106 where leakage L is conveyed to drainage line 104. Drainage line 104 communicates leakage L to reservoir 108. Reservoir 108 can be located in an area having environmental conditions different from those present around or near segments 70A, 70B, and/or 70C. For example, as shown reservoir 108 is located in non-flammable area 110. Non-flammable area 110 can be in one application internal to engine 20 (e.g., a cavity near compressor 24 or turbine section 28), and in other applications external to engine 20. In some embodiments, leakage L that collects in reservoir 108 can be pumped back into assembly 68, or other appropriate locations, and used as fluid F as in normal operation.

Those skilled in the art will appreciate that any number of drainage lines 104 can be used, including multiple drainage lines 104 per segment in desired applications.

Discussion of Possible Embodiments

The following are non-exclusive descriptions of possible embodiments of the present invention.

A drainage assembly comprising: a first segment comprising, a first inner tube defining a first inner tube passage; a first outer tube concentrically disposed around the first inner tube and defining a first outer tube passage; and a first fitting disposed on an end of the first segment, wherein the first fitting has a first inner passage in fluid communication with the first inner tube passage and a first outer passage in fluid communication with the first outer tube passage; a second segment adjacent the first segment, the second segment comprising, a second inner tube defining a second inner tube passage; a second outer tube concentrically disposed around the second inner tube and defining a second outer tube passage; and a second fitting disposed on an end of the second segment adjacent the first fitting, wherein the second fitting has a second inner passage in fluid communication with the second inner tube passage and a second outer passage in fluid communication with the second outer tube passage; a plate configured between the first fitting and the second fitting, wherein the plate has a third inner passage in fluid communication with the first inner passage on one side and the second inner passage on an opposite side, and wherein the plate has a third outer passage in fluid communication with the first outer passage on one side and the second outer passage on an opposite side; and a drainage line in fluid communication with the first outer tube passage or the second outer tube passage.

The assembly of the preceding paragraph can optionally include, additionally and/or alternatively, the following features, configurations and/or additional components:

The drainage line is in fluid communication on one end with the first outer tube passage or the second outer tube passage and in fluid communication on another opposite end with a reservoir.

The reservoir is located in a non-flammable area.

A coupling configured to be in fluid communication with the drainage line and either the first outer tube passage or the second outer tube passage.

The first fitting further comprises a groove on which at least a portion of the first outer passage is located, and wherein the second fitting further comprises a groove on which at least a portion of the second outer passage is located.

A cross-sectional area of the third outer passage is greater than a cross-sectional area of the first outer passage, and wherein the cross-sectional area of the third outer passage is greater than a cross-sectional area of the second outer passage.

Both the first inner passage and the second inner passage are in fluid communication with the third inner passage at all locations radially inside a perimeter of the first inner passage and the second inner passage, and wherein both the first outer passage and the second outer passage are in fluid communication with the third outer passage at less than all locations radially inside a perimeter of the third outer passage.

A cross-sectional area of the first inner passage, a cross-sectional area of the second inner passage, and a cross-sectional area of the third inner passage are generally the same, and wherein a cross-sectional area of the first outer passage and a cross-sectional area of the second outer passage are generally the same.

A cross-sectional area of the third outer passage is greater than a cross-sectional area of the first outer passage, and wherein the cross-sectional area of the third outer passage is greater than a cross-sectional area of the second outer passage.

The first inner tube and the first outer tube are a single integral structure, and wherein the second inner tube and the second outer tube are a single integral structure.

The first outer tube passage is fluidly connected only on the end of the first segment with the first fitting, and wherein the first inner tube passage is fluidly connected on both the end of the first segment with the first fitting and on an end of the first segment opposite the end with the first fitting.

A method for draining a leak in an assembly, the method comprising: conveying a fluid flow through a first inner tube of a first segment, wherein the first segment is positioned in a first area; trapping a fluid leakage from the first inner tube with a first outer tube of the first segment concentrically disposed around the first inner tube; conveying the fluid leakage through the first outer tube to a drainage line; and conveying the fluid leakage through the drainage line to a second area having environmental conditions differing from environmental conditions of the first area.

The method of the preceding paragraph can optionally include, additionally and/or alternatively, the following techniques, steps, features and/or configurations:

Conveying the fluid leakage through the first outer tube to a drainage line comprises: conveying the fluid leakage from the first outer tube to a first outer passage within a first fitting disposed on an end of the first segment; conveying the fluid leakage from the first outer passage to a second outer passage within a plate configured between the first fitting of the first segment and a second fitting of a second segment; conveying the fluid leakage from the second outer passage to a third outer passage within the second fitting disposed on an end of the second segment adjacent the plate; conveying the fluid leakage from the third outer passage to a second outer tube of the second segment concentrically disposed around a second inner tube of the second segment; and conveying the fluid leakage through the second outer tube to the drainage line.

Conveying the fluid flow from the first inner tube of the first segment to a first inner passage of the first fitting; conveying the fluid flow from the first inner passage to a second inner passage within the plate; and conveying the fluid flow from the second inner passage to a third inner passage within the second fitting.

Conveying the fluid leakage from the first outer passage to the second outer passage at less than all locations along a perimeter of a groove of the first fitting; and conveying the fluid leakage from the second outer passage to the third outer passage at less than all locations along a perimeter of a groove of the second fitting.

A drainage assembly comprising: a first segment comprising, a first inner tube defining a first inner tube passage; a first outer tube concentrically disposed around the first inner tube and defining a first outer tube passage; and a first fitting disposed on an end of the first segment, wherein the first fitting has a first inner passage in fluid communication with the first inner tube passage and a first outer passage in fluid communication with the first outer tube passage; a plate configured adjacent the first fitting, wherein the plate has a second inner passage in fluid communication with the first inner passage on one side, and wherein the plate has a second outer passage in fluid communication with the first outer passage on the one side; and a drainage line in fluid communication with the first outer tube passage.

The assembly of the preceding paragraph can optionally include, additionally and/or alternatively, the following features, configurations and/or additional components:

The plate further comprises a plurality of second outer passages circumferentially spaced around the plate, and wherein the plurality of second outer passages are arc-shaped.

The first fitting further comprises a groove on which at least a portion of the first outer passage is located.

A cross-sectional area of the first inner tube passage is greater than a cross-sectional area of the first outer passage.

The first outer tube passage is fluidly connected only on the end of the first segment with the first fitting, and wherein the first inner tube passage is fluidly connected on both the end of the first segment with the first fitting and on an end of the first segment opposite the end with the first fitting.

Any relative terms or terms of degree used herein, such as "generally", "substantially", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A drainage assembly comprising:
    a first segment comprising,
        a first inner tube defining a first inner tube passage, wherein the first inner tube passage has a first inner cross-sectional area;
        a first outer tube concentrically disposed around the first inner tube and defining a first outer tube passage, wherein the first outer tube passage has a first outer cross-sectional area; and
        a first fitting disposed on an end of the first segment, wherein the first fitting has a first inner passage in fluid communication with the first inner tube passage and a first outer passage in fluid communication with the first outer tube passage;
    a second segment adjacent the first segment, the second segment comprising,
        a second inner tube defining a second inner tube passage, wherein the second inner tube passage has a second inner cross-sectional area;
        a second outer tube concentrically disposed around the second inner tube and defining a second outer tube passage, wherein the second outer tube passage has a second outer cross-sectional area; and
        a second fitting disposed on an end of the second segment adjacent the first fitting, wherein the second fitting has a second inner passage in fluid communication with the second inner tube passage and a second outer passage in fluid communication with the second outer tube passage;
    a plate configured between the first fitting and the second fitting, wherein:
        the plate has a third inner passage in fluid communication with the first inner passage on one side and the second inner passage on an opposite side;
        the third inner tube passage has a third inner cross-sectional area;
        the plate has a third outer passage in fluid communication with the first outer passage on one side and the second outer passage on an opposite side;
        the third outer tube passage has a third outer cross-sectional area, wherein the first inner cross-sectional area, the second inner cross-sectional area, the third inner cross-sectional area are generally the same;
        the first outer cross-sectional area and the second outer cross-sectional area are generally the same;
        the third outer cross-sectional area is greater than first outer cross-sectional area, and
        the third outer cross-sectional area is greater than the second outer cross-sectional area; and
    a drainage line in fluid communication with the first outer tube passage or the second outer tube passage.

2. The assembly of claim 1, wherein the drainage line is in fluid communication on one end with the first outer tube passage or the second outer tube passage and in fluid communication on another opposite end with a reservoir.

3. The assembly of claim 2, wherein the reservoir is located in a non-flammable area.

4. The assembly of claim 1, further comprising:
    a coupling configured to be in fluid communication with the drainage line and either the first outer tube passage or the second outer tube passage.

5. The assembly of claim 1, wherein the first fitting further comprises a groove on which at least a portion of the first outer passage is located, and wherein the second fitting further comprises a groove on which at least a portion of the second outer passage is located.

6. The assembly of claim 1, wherein both the first inner passage and the second inner passage are in fluid communication with the third inner passage at all locations radially inside a perimeter of the first inner passage and the second inner passage, and wherein both the first outer passage and the second outer passage are in fluid communication with the third outer passage at less than all locations radially inside a perimeter of the third outer passage.

7. The assembly of claim 1, wherein the first inner tube and the first outer tube are a single integral structure, and wherein the second inner tube and the second outer tube are a single integral structure.

8. The assembly of claim 1, wherein the first outer tube passage is fluidly connected only on the end of the first segment with the first fitting, and wherein the first inner tube passage is fluidly connected on both the end of the first segment with the first fitting and on an end of the first segment opposite the end with the first fitting.

9. A method for draining a leak in an assembly, the method comprising:
    conveying a fluid flow through a first inner tube of a first segment, wherein the first segment is positioned in a first area;
    trapping a fluid leakage from the first inner tube with a first outer tube of the first segment concentrically disposed around the first inner tube;

conveying the fluid leakage through the first outer tube to a drainage line, wherein conveying the fluid leakage through the first outer tube to the drainage line comprises:
  conveying the fluid leakage from the first outer tube to a first outer passage within a first fitting disposed on an end of the first segment;
  conveying the fluid leakage from the first outer passage to a second outer passage within a plate configured between the first fitting of the first segment and a second fitting of a second segment;
  conveying the fluid leakage from the second outer passage to a third outer passage within the second fitting disposed on an end of the second segment adjacent the plate;
  conveying the fluid leakage from the third outer passage to a second outer tube of the second segment concentrically disposed around a second inner tube of the second segment; and
  conveying the fluid leakage through the second outer tube to the drainage line;
conveying the fluid leakage through the drainage line to a second area having environmental conditions differing from environmental conditions of the first area;
conveying the fluid leakage from the first outer passage to the second outer passage at less than all locations along a perimeter of a groove of the first fitting; and
conveying the fluid leakage from the second outer passage to the third outer passage at less than all locations along a perimeter of a groove of the second fitting.

10. The method of claim 9, further comprising:
conveying the fluid flow from the first inner tube of the first segment to a first inner passage of the first fitting;
conveying the fluid flow from the first inner passage to a second inner passage within the plate; and
conveying the fluid flow from the second inner passage to a third inner passage within the second fitting.

11. A drainage assembly comprising:
a first segment comprising,
  a first inner tube defining a first inner tube passage;
  a first outer tube concentrically disposed around the first inner tube and defining a first outer tube passage; and
  a first fitting disposed on an end of the first segment, wherein the first fitting has a first inner passage in fluid communication with the first inner tube passage and a first outer passage in fluid communication with the first outer tube passage, and wherein the first fitting further comprises a groove on which at least a portion of the first outer passage is located;
a plate configured adjacent the first fitting, wherein the plate has a second inner passage in fluid communication with the first inner passage on one side, and wherein the plate has a second outer passage in fluid communication with the first outer passage on the one side; and
a drainage line in fluid communication with the first outer tube passage.

12. The assembly of claim 11, wherein the plate further comprises a plurality of second outer passages circumferentially spaced around the plate, and wherein the plurality of second outer passages are arc-shaped.

13. The assembly of claim 11, wherein a cross-sectional area of the first inner tube passage is greater than a cross-sectional area of the first outer passage.

14. The assembly of claim 11, wherein the first outer tube passage is fluidly connected only on the end of the first segment with the first fitting, and wherein the first inner tube passage is fluidly connected on both the end of the first segment with the first fitting and on an end of the first segment opposite the end with the first fitting.

\* \* \* \* \*